May 27, 1952     F. P. VACHA     2,598,623
DYNAMOELECTRIC MACHINE
Filed March 29, 1949     5 Sheets-Sheet 2
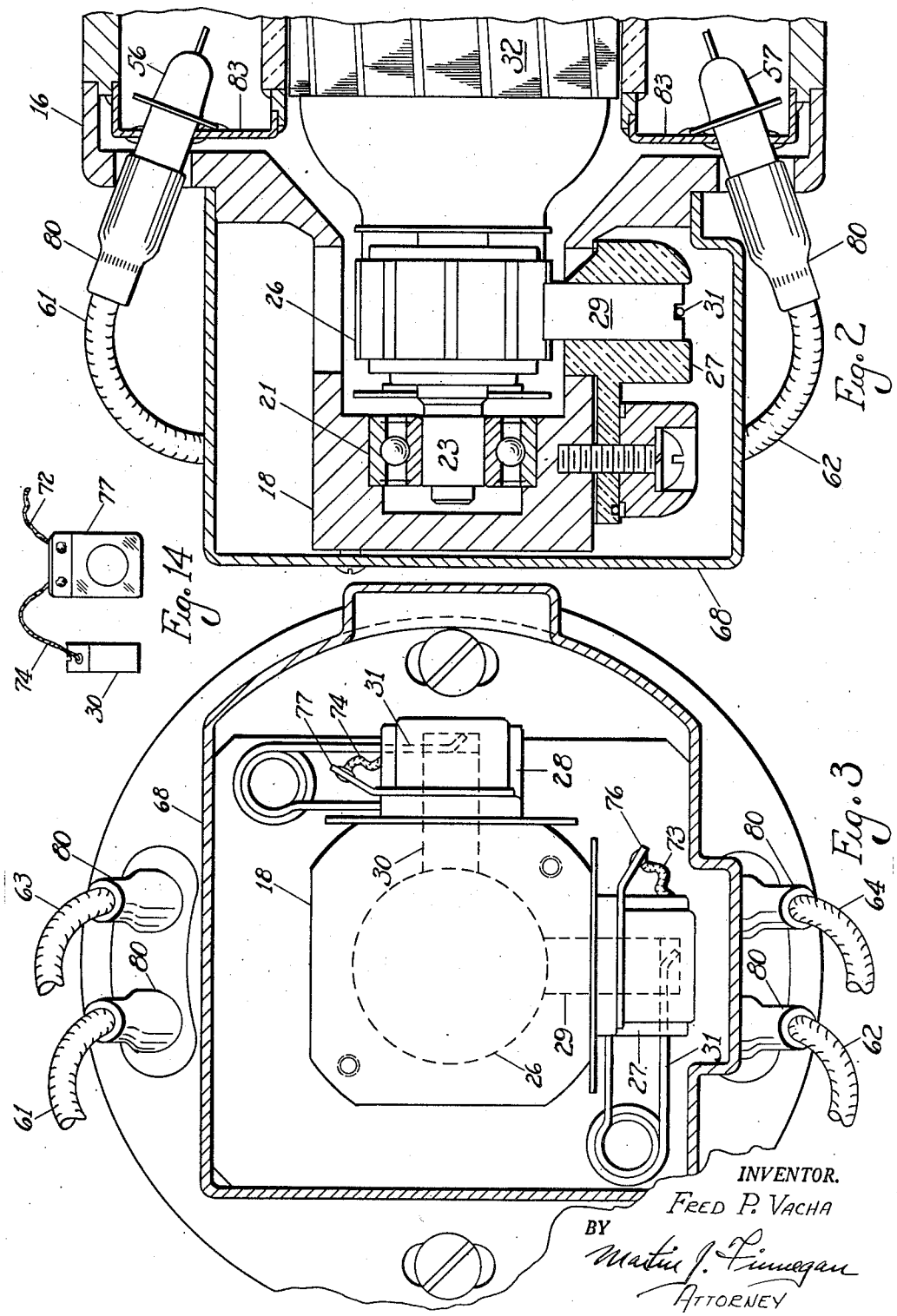
INVENTOR.
FRED P. VACHA
BY
Martin J. Finnegan
ATTORNEY May 27, 1952     F. P. VACHA     2,598,623
DYNAMOELECTRIC MACHINE
Filed March 29, 1949     5 Sheets-Sheet 3

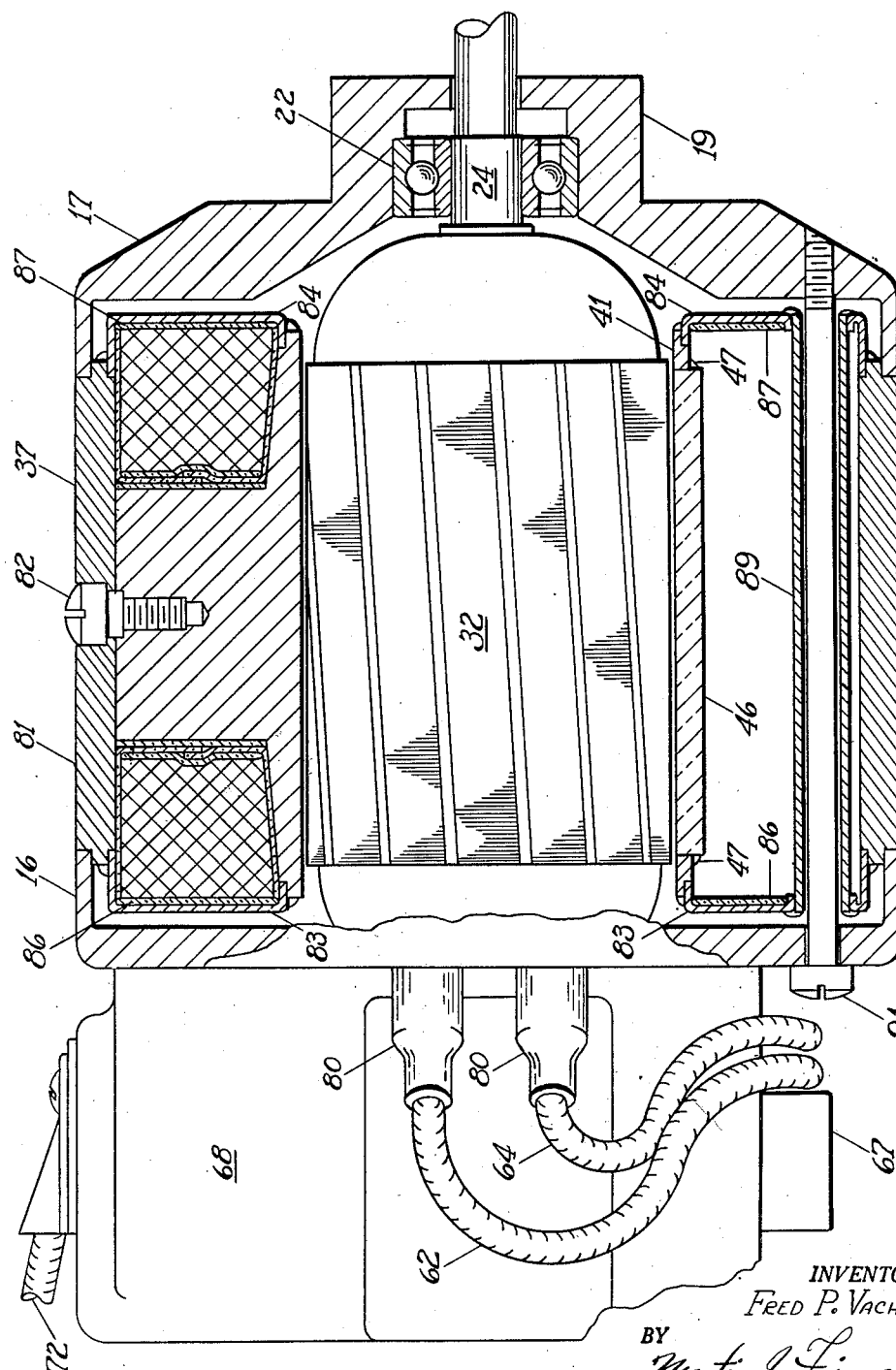

INVENTOR.
FRED P. VACHA
BY Martin J. Finnegan
ATTORNEY

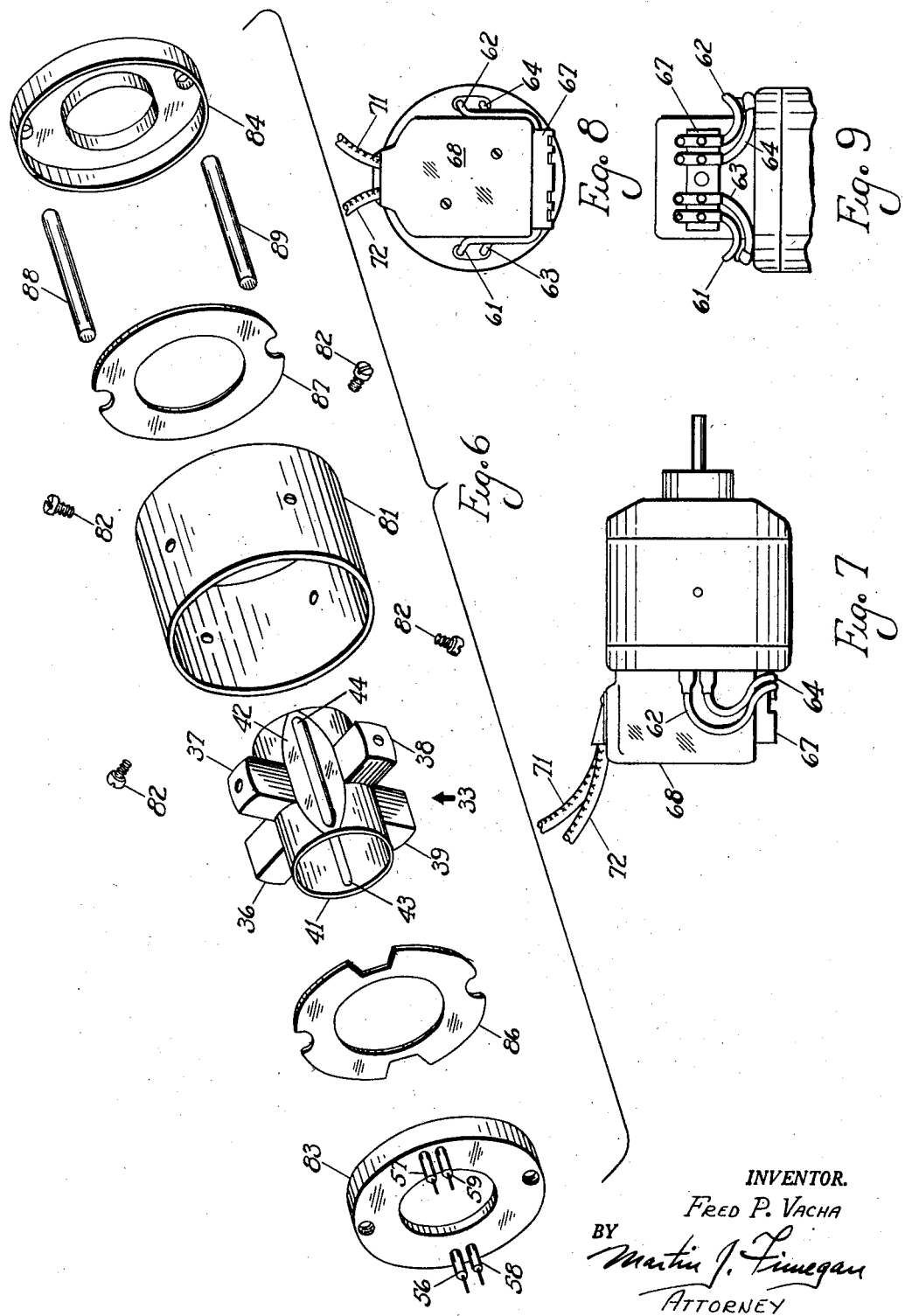

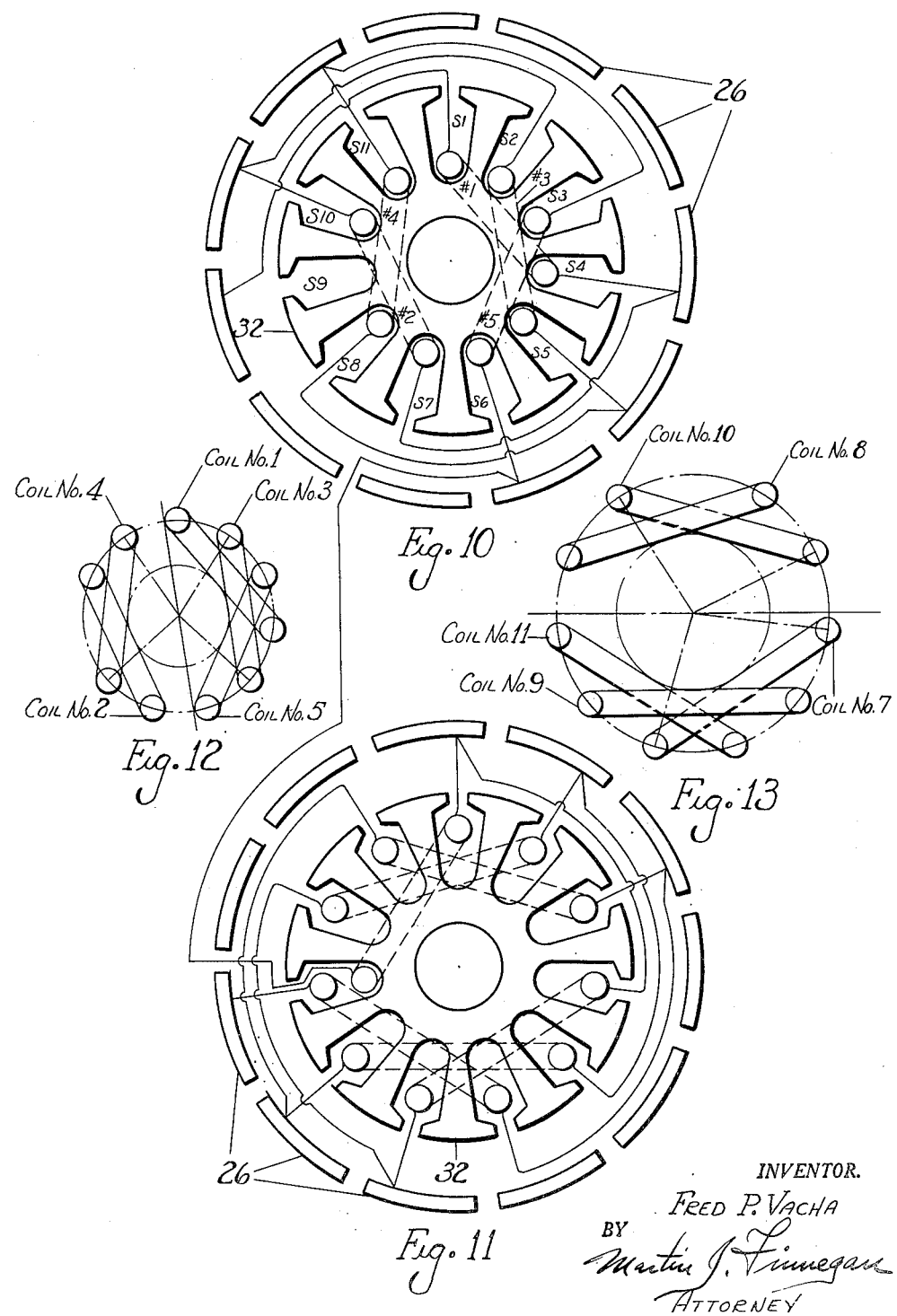

Patented May 27, 1952

2,598,623

UNITED STATES PATENT OFFICE 2,598,623

DYNAMOELECTRIC MACHINE

Fred P. Vacha, Auburndale, Mass., assignor, by mesne assignments, to National Pneumatic Co., Inc., a corporation of Delaware Application March 29, 1949, Serial No. 84,138

5 Claims. (Cl. 171—252)

This invention relates to dynamo electric machines, and particularly to machines including a multi-polar stationary field structure surrounding a rotatable armature.

For certain navigational and intelligence transmitting or receiving purposes, on shipboard, on aircraft, and at military stations, it is desirable to employ small instruments having an index element that can be rotated in either direction, as occasion requires, by direct or geared connection to a relatively high speed electric motor. It is further desirable that the driving motor be no larger in diameter than the instrument itself, in order that both instrument and driving motor may fit within a small mounting recess or opening in a wall or panel serving as the common mounting means for a large number of associated instruments. Moreover, it is desirable that the entire motor assembly be electro-statically shielded, to prevent emission of radiant energy of any frequency, as such emissions would interfere with and impair the quality of incoming or outgoing radio or radar signals intended for instrument adjacent to the motor. Again, it is desirable that the motor stator be hermetically sealed, so that no moisture may enter; the electro-magnetic performance requirements of the machine being so precisely specified that the entry of even a slight amount of moisture would set up a corroding action to impair the capacity of the motor to continue to perform at specified speed and torque values.

The present invention provides a motor embodying novel structure and inter-relationships of component parts, which structure and inter-relationships render it capable of meeting the exacting requirements of the instrument-driving applications above referred to, and including the following characteristics among others: small diameter, complete radio shielding, hermetically sealed stator assembly, and quick reversing, even at speeds as high as 15,000 R. P. M.

An object of the invention, therefore, is to provide a dynamo electric machine of novel construction, capable of performing as indicated, and having the characteristics listed above.

A second object of the invention is to provide a novel method of constructing a stator assembly involving a plurality of angularly spaced field coils; the novelty including, first, the forming of the complete multi-polar assembly out of a single cylindrical block of magnetic steel, so that the space relationships between successive poles is incapable of any variation whatever—all poles being integral parts of a single block of metal; secondly, the cutting of parallel slots along the wall of said single cylindrical block, but terminating short of its ends, to divide each polar field from the adjacent one; and thirdly, the subsequent bonding of non-magnetic "sealing sticks" to the block, to over-lie and cover said slots, and increase the rigidity of the stator assembly.

A third object of the invention is to provide a machine having a sealed stator assembly of novel construction, including the features resulting from the novel construction steps above recited.

A fourth object is to provide a rotor assembly of novel construction, particularly in the arrangement of the armature windings in a novel manner, featuring greater symmetry and balance.

These and other objects of the invention will be understood upon examination of the following description of the invention, in one of its concrete exemplifications, as illustrated in the accompanying drawings wherein:

Fig. 1 is a view, partly in longitudinal section and partly in elevation, and on a greatly enlarged scale, of a motor embodying the invention;

Fig. 2 is a sectional view of that end of the motor shown in elevation in Fig. 1;

Fig. 3 is an end view, on the same scale as Figs. 1 and 2—the end plate being sectioned to show certain interior details;

Fig. 6 is an exploded perspective view of the complete stator assembly, except for the field coils shown in Fig. 5; the scale of Fig. 6 being, however, much reduced from that of Figs. 1 to 4;

Fig. 7 is an elevation view of the motor, on a scale approximating actual size;

Fig. 8 is an end view of the motor, on the same scale as Fig. 7;

Fig. 9 is a bottom plan view of the end shown in Fig. 8;

Figures 4, 5:
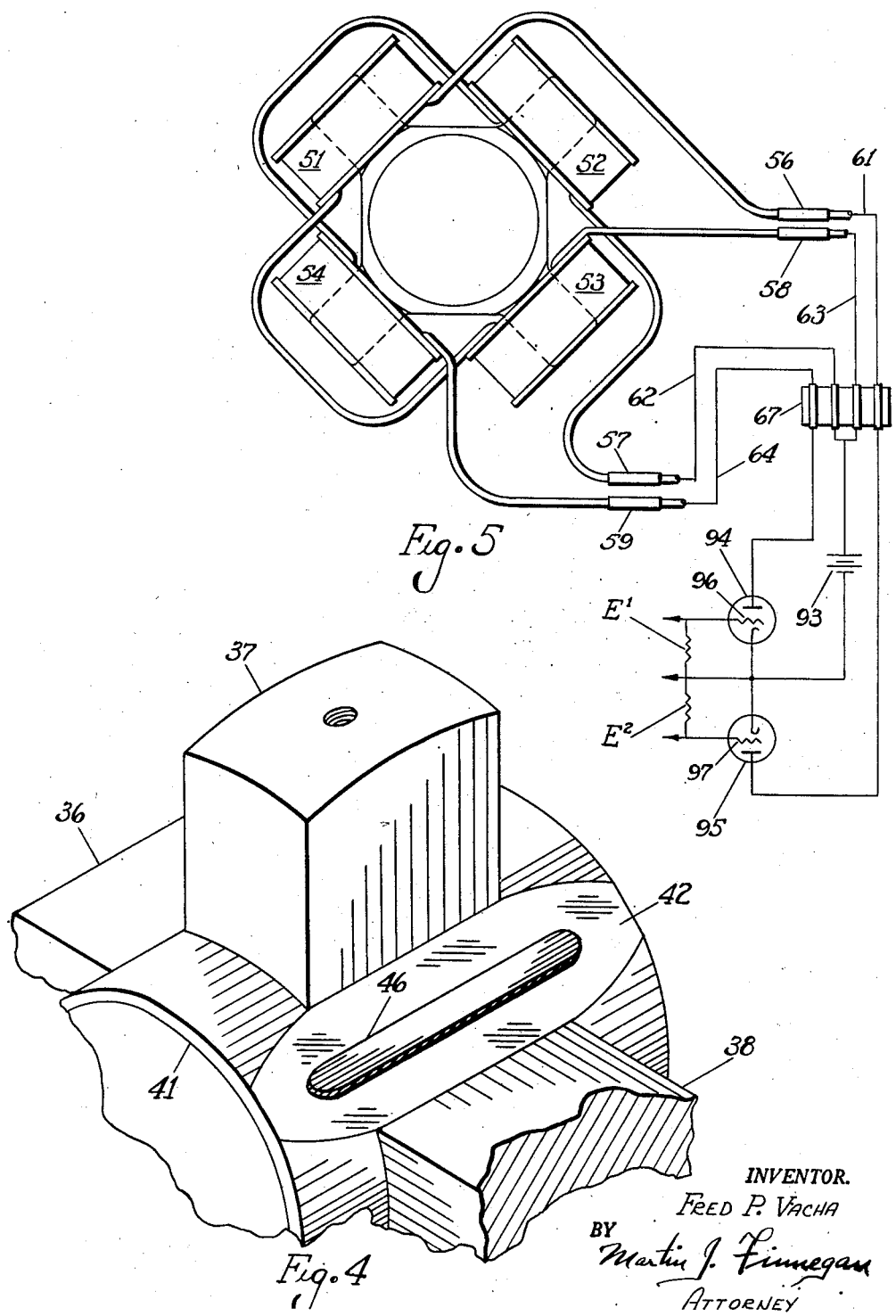
Fig. 4 is a perspective view showing part of the stator portion of the motor.
Fig. 5 shows schematically the stator pole arrangement and the electrical connections to the respective pole windings (field coils) comprising the field circuit of the motor.

Figs. 10 and 11 indicate schematically the method of placing and inter-connecting the successive armature coils, in relation to the physical positions of the respective armature slots and the associated commutator bars, also shown schematically;

Figs. 12 and 13 indicate schematically the approximate physical balancing of the armature coils, by placement thereof in four groups on opposite sides of central horizontal and vertical dividing planes, and with each coil of each group lying in a plane that is tangent to one of a pair of concentric cylinders, with all such planes of each group equally distant from the axis of rotation of the motor, thus achieving a condition of greatest physical balance; and Fig. 14 shows the electrical connections to one of the motor brushes.

Referring first to Figs. 1 and 2, the motor is there shown as confined between two end castings 16, 17 having hub portions 18, 19, for reception of ball-bearing assemblies 21, 22, respectively; said bearing assemblies serving to support rotatably the opposite ends 23, 24 of the armature shaft. End casting 16 also encloses the commutator portion 26 of the rotor assembly, and carries two blocks 27, 28 of insulating material, in each of which is slidably received a brush (29 or 30, see also Fig. 3) forming part of the armature circuit. These brushes are slotted at their outer ends to receive spring fingers 31, yieldably pressing them against the commutator 26.

Surrounding the armature 32 is the stator assembly, the component parts of which, as above suggested, are constructed and inter-related in novel ways, and by novel means, now to be described. First, a substantially cylindrical block of magnetic steel is machined to the shape indicated at 33 in Fig. 6—that is, to a shape in which there will be four (if that is the number desired) integral radial projections 36, 37, 38, 39 to comprise the field poles of the motor, and a thin cylindrical nuclear portion 41, the latter having its outer cylindrical surface shaved away sufficiently at four sections (that is, the sections between poles) to reduce to a minimum the amount of magnetic iron between successive poles, within the projected limits thereof, without at the same time reducing the mechanical strength of the shell 41 beyond a safe limit. One such shaved-away section is illustrated at 42 in Figs. 4 and 6. In order further to minimize the amount of magnetic iron between poles each shaved-away section is longitudinally slotted, as indicated at 43 and 44 in Fig. 6, for almost its entire length, leaving only sufficient magnetic metal at the extreme ends to prevent physical rupture. These four slots 43, 44 are then sealed up by inserting therein tight-fitting sealing sticks 46 of non-magnetic metal, and each sealing stick (see especially Fig. 4) is hermetically integrated to the shell 41 by applying molten bonding material 47 (solder or the like) along all normal surfaces of the stick, where such surfaces project beyond the edges of the shell—the sticks being purposely made of a dimension, relative to the shell thickness, that will produce a substantial area of projecting surface when inserted in the shell. (See Fig. 1.)

Attention is particularly directed to the projecting surfaces of the sticks 46, and to the step of bonding said sticks to the shell by applying the solder 47 to these projecting surfaces. The solder thus applied forms extensive re-inforcing and sealing "fillets" so to speak, which fillets insure against any possibility of leakage either magnetic or physical.

Each polar projection 36, 37, 38, 39 receives a field coil (51, 52, 53, or 54, as indicated in Fig. 5) and one end of each field coil winding is inserted into one of the four glass tubes 56, 57, 58, or 59, these glass tubes serving as insulating envelopes by which an hermetically tight seal may be effected at the points where the coil ends make electrical connection with the external leads 61, 62, 63 and 64 respectively, all of which are supplied with field-energizing current from a suitable source 93, as indicated schematically in Fig. 5. Between such source 93 and the leads 61—64, however, there is interposed a terminal block 67 (see Figs. 7, 8 and 9), said terminal block being of insulating material, and attached to the base of the rectangular box-like metallic casing 68 which surrounds and electro-statically shields the commutator end of the motor. At its upper side the casing 68 is apertured to allow entry of the leads 71, 72 from a second source of current. These leads do not extend to terminal block 67, but go directly to the terminals 76, 77 of the armature circuit. The armature circuit is composed of the armature windings of Figs. 10 and 11 and the associated commutator bars 26, these latter being connected with terminal lugs 76, 77 by way of brushes 29, 30, and leads 73, 74, each of which is soldered to one of the two holes in each of the terminal lugs. The other hole in each of the terminal lugs has soldered thereto one of the supply leads, 71 or 72, as the case may be. Fig. 14 shows the method of connection from each brush to its respective terminal lug.

Returning now to the stator construction, this includes, in addition to the inner shell 41, with its integral polar projections 36—39, on outer shell 81 (Figs. 1 and 6) fitting over the polar projections 36—39 and attached thereto, as by screws 82. The stator further includes a pair of metallic (but non-magnetic) end caps 83, 84, with associated non-metallic insulators 86, 87 (Fig. 6), and a pair of tubular pieces 88, 89 serving as retaining tubes for the entire stator assembly, when soldered at their ends to the respective end caps 83, 84 as will be further explained. These tubes 88, 89 receive the through-bolts 91 (one of which is shown in Fig. 1) extending from end casting 16 to end casting 17 and thus securing the stator assembly in position around the rotor assembly.

The successive steps in the assembly of the stator elements shown in Fig. 6 are as follows:

1. Solder pole sealing sticks 46 to shell 41, to seal up the shell slots.

2. Place coils 51—54 over pole shanks 36—39 and assemble into outer shell 81. Attach screws 82 securely.

3. Solder leads together and pass ends between poles.

4. Cut leads as short as possible, then solder ends to terminals 56—59. Sleeving 80 is then placed over these connections.

5. Insert insulators 86, 87 in sealing caps 83, 84 and assemble caps by fitting the inside flanges over rims of inner shell 41, and fitting the outside flanges into outer shell 81.

6. Slide tubes 88, 89 through extruded holes of caps and solder both ends to the caps.

7. Solder inner flanges of caps to inner shell 41 and outer flanges to outer shell 81.

8. Seal the heads to screws 82 with solder or its equivalent.

It will be observed that upon completion of these operations, the entire field structure of the motor is hermetically sealed, independently of the rotor assembly, and independently of the housing elements 16 and 17, which therefore are not a part of the hermetically sealed unit.

In addition to the field circuit connections previously described, Fig. 5 includes a showing of external electrical connections from a battery 93 to the individual terminal strips insulatedly mounted on the previously described terminal block 67; the circuit from the battery to the terminal block also including the triodes 94 and 95 whose respective control grids 96 and 97 serve to determine the direction of current flow through the motor field circuit and thus determine the direction of rotation of the motor. When the two circuit branches indicated at E¹ and E² (connecting with a rudder mechanism or other apparatus of the control system with which the motor herein disclosed happens to be utilized) are at equal potential, there will of course be no electronic flow at either of the grids 96, 97. Upon the occurrence of a voltage unbalance, however, the grids will receive positive or negative bias, depending upon the direction of the voltage differential, and current will then flow from the battery 93 to the field circuit of the motor in a direction corresponding to the direction of voltage differential. The motor will accordingly start to rotate in the corresponding direction, and will continue to rotate in said direction until a condition of equilibrium is restored as between the two circuit branches E¹ and E². The grid bias having then been overcome, the flow of current in the field circuit will cease and the motor will come to rest, and will remain at rest until a voltage unbalance again develops. It will be understood, of course, that any equivalent electrical or electronic control devices may be substituted for those indicated at 94 and 95 in Fig. 5.

The novel method of placing and inter-connecting the eleven armature coils in the eleven armature slots (the details of which are believed to be self-explanatory upon reference to Figs. 10 and 11) has the advantage of establishing a better physical balance in the rotor assembly, as will be apparent upon reference to Figs. 12 and 13 wherein are indicated coils 1–5 and 7–11, respectively; the intermediate coil #6 being omitted in these two explanatory Figs. 12 and 13 in order to better illustrate the physical advantages derived from the system of spacing and connecting the coils as illustrated in Figs. 10 and 11. If the number of coils in the armature were ten rather than eleven (or some other even number) the degree of physical balance obtained would be complete, that is, it would conform exactly to the scheme illustrated in Figs. 12 and 13. In other words, all coils of the first sequence would be centrally tangent to the inner one of two concentric circles (see Fig. 12) and all coils in the outer sequence would be centrally tangent to the outer one of the two concentric circles (see Fig. 13); such central tangency, and concentricity, being the key to the attainment of the maximum degree of physical balance.

As actually illustrated in Figs. 10 and 11, the winding sequence, for the eleven slots illustrated, is as follows: Beginning with the commutator bar opposite slot "S9," the wire (or wire group) is carried around a distance of three slots (approximately one pole-pitch, with the four-pole machine illustrated) to armature slot No. 1. The first coil is then wound in slots Nos. 1 and 4, approximately one pole pitch apart. From slot "S4" the last turn of coil No. 1 is carried out to the adjacent commutator bar, then across to slot "S7," approximately one pole pitch from slot "S4." Coil No. 2 is then wound in slots 7 and 10. The same procedure is followed in the successive winding of coils 3 to 11, the entire winding operation proceeding as a continuous step, that is, there being no severance of the wire at any point in the cycle. The result is a mechanical balance of the inner and outer groups of coils, 1 to 5, and 7 to 11, respectively, as indicated schematically in Figs. 12 and 13.

What I claim is:

1. In a dynamo-electric machine, in combination with a rotor and housing elements supporting opposite end portions of said rotor, a stator assembly supported between and by said housing elements, said stator assembly including concentrically disposed inner and outer metallic cylinders, the inner cylinder having a plurality of solid metallic extensions projecting radially outward to the inner surface of said outer cylinder, said solid radial extensions being integral parts of a single block of metal, and constituting the polar elements of said stator assembly, and means for hermetically sealing said stator assembly independently of said housing elements and said rotor.

2. A machine as defined in claim 1, wherein said sealing means includes a plurality of preformed sticks of non-magnetic material inserted in slotted areas of said inner cylinder, between each pair of poles.

3. A machine as defined in claim 2, wherein said sticks have a thickness considerably greater than the thickness of said inner cylinder, to provide surface area for receipt of sealing material to hermetically close said slotted areas.

4. The method of sealing a magnetic pole structure, comprising the forming of the complete pole structure from a single piece of metal, slotting the piece between polar projections, and filling said slots with preformed sticks of non-magnetic material having a length corresponding to that of said slots.

5. The method of claim 4, plus the further step of sealing the pole windings (field coils) against entry of moisture or other foreign substance.

FRED P. VACHA.

REFERENCES CITED

The following references are of record in the file of this patent:

UNITED STATES PATENTS

| Number | Name | Date |
| --- | --- | --- |
| 1,269,909 | Cooper | June 18, 1918 |
| 1,644,718 | Fitzgerald | Oct. 11, 1927 |
| 1,722,284 | Fisher | July 30, 1929 |
| 1,807,252 | Quackenbush | May 26, 1931 |
| 2,127,847 | Schulte | Aug. 23, 1938 |
| 2,153,563 | Hubacker | Apr. 11, 1939 |
| 2,340,905 | Sigmund et al. | Feb. 8, 1944 |
| 2,450,982 | O'Brien | Oct. 12, 1948 |

FOREIGN PATENTS

| Number | Country | Date |
| --- | --- | --- |
| 463,015 | Great Britain | Mar. 19, 1937 |